United States Patent
Obaidat et al.

(10) Patent No.: US 11,152,160 B1
(45) Date of Patent: Oct. 19, 2021

(54) HIGH-RATE HYBRID SUPERCAPACITOR

(71) Applicant: UNITED ARAB EMIRATES UNIVERSITY, Al Ain (AE)

(72) Inventors: Ihab M. Obaidat, Al Ain (AE); Hee-Je Kim, Busan (KR); Chandu V. V. Muralee Gopi, Busan (KR); Sambasivam Sangaraju, Al Ain (AE)

(73) Assignee: UNITED ARAB EMIRATES UNIVERSITY, Al Ain (AE)

( * ) Notice: Subject to any disclaimer, the term of this patent is extended or adjusted under 35 U.S.C. 154(b) by 0 days.

(21) Appl. No.: 17/021,247

(22) Filed: Sep. 15, 2020

(51) Int. Cl.
| | |
|---|---|
| *H01G 11/46* | (2013.01) |
| *H01G 11/24* | (2013.01) |
| *H01G 11/70* | (2013.01) |
| *H01G 11/62* | (2013.01) |

(52) U.S. Cl.
CPC ............. *H01G 11/46* (2013.01); *H01G 11/24* (2013.01); *H01G 11/62* (2013.01); *H01G 11/70* (2013.01)

(58) Field of Classification Search
CPC ................................. H01G 11/46; H01G 11/24
See application file for complete search history.

(56) References Cited

U.S. PATENT DOCUMENTS

| | | |
|---|---|---|
| 9,875,654 B2 | 1/2018 | Lim et al. |
| 2015/0251919 A1* | 9/2015 | Zhao ................. C01B 32/192 252/182.1 |

FOREIGN PATENT DOCUMENTS

| | | |
|---|---|---|
| CN | 105336503 A | 2/2016 |
| CN | 105869911 A | 8/2016 |
| CN | 109103027 A | 12/2018 |
| JP | 2013181177 A | 9/2013 |
| WO | 2011141486 A1 | 11/2011 |

OTHER PUBLICATIONS

Zhao et al., "Construction of CuO/Cu2O@CoO core shell nanowire arrays for high-performance supercapacitors", Surface and Coatings Technology (2016), vol. 299, pp. 15-21.

Gopi et al., "One-pot synthesis of copper oxide-cobalt oxide core-shell nanocactus-like heterostructures as binder-free electrode materials for high-rate hybrid supercapacitors", Materials Today Energy (Nov. 2019), vol. 14, 9 pages.

* cited by examiner

*Primary Examiner* — Eric W Thomas
(74) *Attorney, Agent, or Firm* — Nath, Goldberg & Meyer; Richard C. Litman

(57) ABSTRACT

The high-rate hybrid supercapacitor (HSC) has a positive electrode made from copper oxide (CuO)-cobalt oxide (CoO) core-shell nanocactus-like heterostructures produced on a nickel foam substrate, a negative electrode made by coating nickel foam with graphene ink, and a separator of cellulose paper. The heterostructures each have a core of CuO nanoflakes and a shell of CoO nanoneedles extending from the nanoflakes. The HSC achieves a specific capacity of 173.9 mA h g$^{-1}$ at 1 A g$^{-1}$ and long cycle life with 94% retention over 5000 cycles at 4 A g$^{-1}$, and also exhibits a stable operating voltage window of 1.6 V, energy density of 56.5 W h kg$^{-1}$, and cycling stability of 98.8% retention with coulombic efficiency of 98.7% over 4000 cycles.

13 Claims, 13 Drawing Sheets

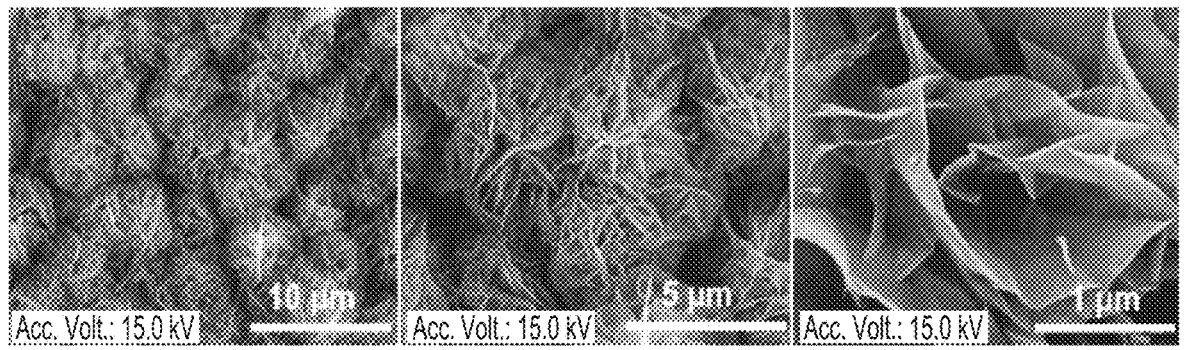
*FIG. 2A*   *FIG. 2B*   *FIG. 2C*
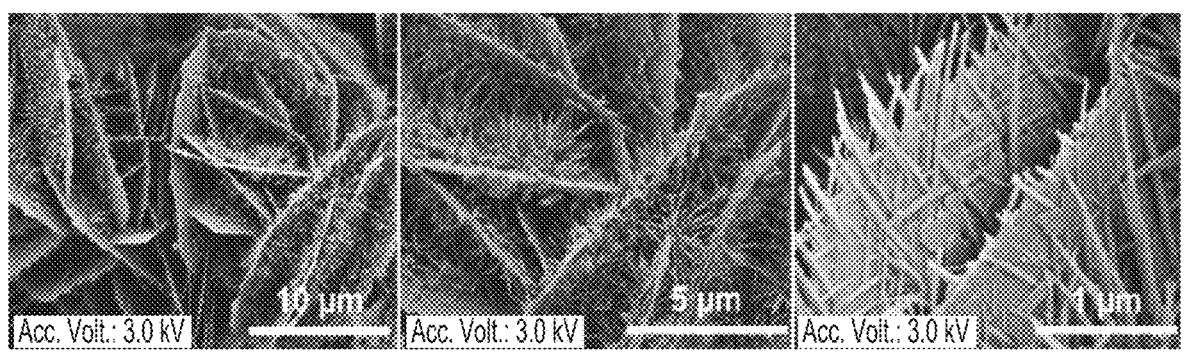
*FIG. 2D*   *FIG. 2E*   *FIG. 2F*

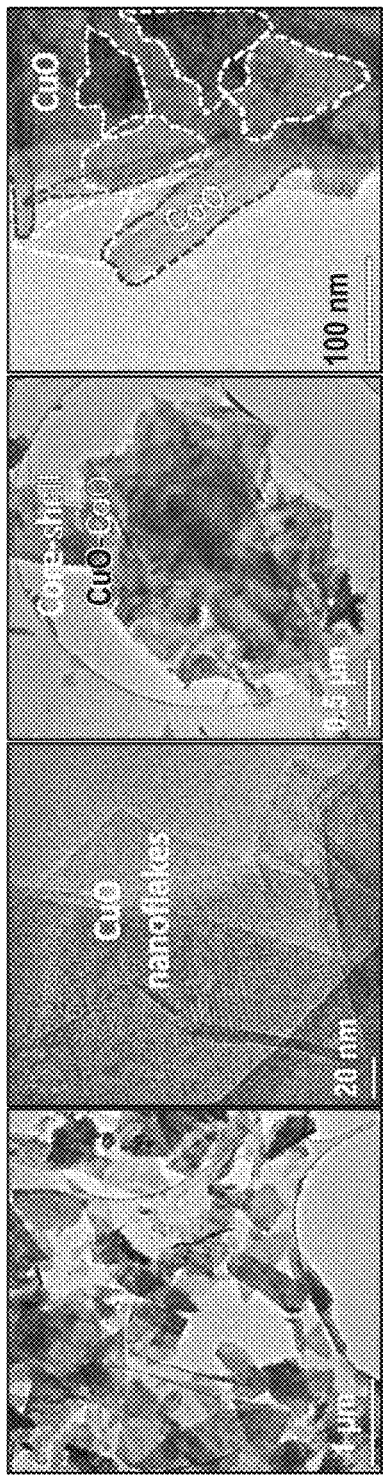
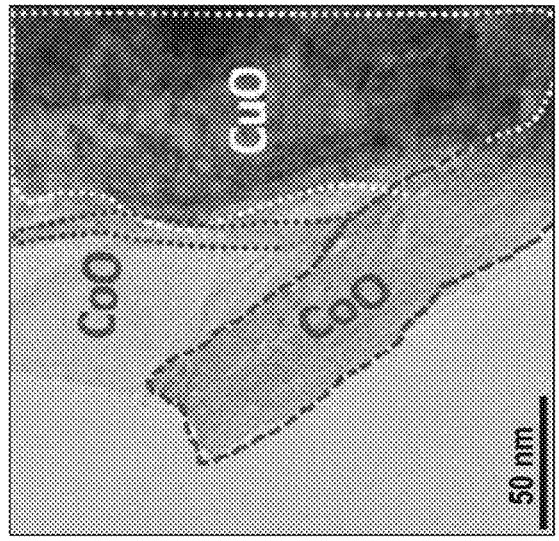
FIG. 3A  FIG. 3B  FIG. 3C  FIG. 3D
FIG. 3E

HIGH-RATE HYBRID SUPERCAPACITOR

BACKGROUND

1. Field

The disclosure of the present patent application relates generally to supercapacitors, and particularly to a high-rate hybrid supercapacitor having a positive electrode made from copper oxide (CuO)-cobalt oxide (CoO) core-shell nanocactus-like heterostructures produced on a nickel foam substrate.

2. Description of the Related Art

Supercapacitors (SC) have properties intermediate electrolytic capacitors and rechargeable batteries, having higher capacitance but lower voltage limits. Supercapacitors typically have rapid charge-discharge rates, high power density, and outstanding cycling performance. Improving energy density, power density and cycling performance could make SCs suitable for next-generation high-performance energy storage devices. However, SCs deliver lower energy density than rechargeable batteries, limiting their commercialization. Hybrid (or asymmetric) supercapacitors have higher operating voltage (up to 3.8 V) and much higher capacitance and energy density than symmetric supercapacitors. Asymmetric/hybrid SCs (ASCs/HSCs) may achieve improved energy density. Asymmetric/hybrid SCs combine pseudocapacitor/battery-type and electrostatic double-layer capacitor (EDLC) materials. Novel anode and cathode materials may allow for fabrication of ASCs with higher energy density capabilities.

Generally, pseudocapacitor/battery-type materials ($MnO_2$, NiO, CuO, CoO, $Co_3O_4$, $NiCo_2O_4$, etc.) deliver high energy storage properties, while the EDLC materials (such as porous carbon or reduced graphene oxide) exhibit a large operating potential window and high stability. The performance of SCs mainly relies on the type, structure and morphology of the electrode materials. Therefore, selection and design of electroactive materials is essential for high performance SCs. Among various battery-type materials, CuO can form interesting morphologies with superior redox activity, high theoretical capacitance, low cost and has earth abundance. However, CuO also tends to have low energy density, poor rate performance, low cycling behavior, low electrical conductivity, and limited surface area. Recently, CuO combined with other transition metal oxides (TMOs) has shown further enhanced electrical conductivity, surface area and specific capacitance. However, the energy storage performance of existing CuO-based composite materials is not sufficient for practical use. Therefore, design, synthesis, and integration of efficient CuO material with other highly effective metal oxide material is needed to attain high energy storage performance.

Cobalt-based materials, such as $Co_3O_4$ and CoO, are promising electroactive materials in supercapacitors due to their high theoretical capacitances (3561 $F\ g^{-1}$ for $Co_3O_4$ and 5722 $F\ g^{-1}$ for CoO at 0.45 V), environmental friendliness, cost-effectiveness and easy preparation, respectively. CoO has a larger theoretical capacitance than other cobalt oxides. However, the specific capacitance of the most studied CoO is much lower than the theoretical values. Furthermore, CuO and CoO materials each possess their own distinct reductive reaction potential.

Thus, a high-rate hybrid supercapacitor solving the aforementioned problems is desired.

SUMMARY

The high-rate hybrid supercapacitor (HSC) has a positive electrode made from copper oxide (CuO)-cobalt oxide (CoO) core-shell nanocactus-like heterostructures produced on a nickel foam substrate, a negative electrode made by coating nickel foam with graphene ink, and a separator of cellulose paper. The heterostructures each have a core of CuO nanoflakes and a shell of CoO nanoneedles extending from the nanoflakes. The HSC achieves a specific capacity of 173.9 $mA\ h\ g^{-1}$ at 1 $A\ g^{-1}$ and long cycle life with 94% retention over 5000 cycles at 4 $A\ g^{-1}$, and also exhibits a stable operating voltage window of 1.6 V, energy density of 56.5 $W\ h\ kg^{-1}$, and cycling stability of 98.8% retention with coulombic efficiency of 98.7% over 4000 cycles. The positive electrode material is made by heating nickel foam in an aqueous mixture of nitrate salts of copper and cobalt, urea, and ammonium fluoride at 150° C. for 5 hours, followed by annealing in nitrogen atmosphere.

These and other features of the present teachings will become readily apparent upon further review of the following specification.

BRIEF DESCRIPTION OF THE DRAWINGS

FIGS. 2A, 2B, and 2C are scanning electron microscope (SEM) micrographs of CuO nanoparticles synthesized on a nickel foam substrate at increasing magnification.

FIGS. 2D, 2E, and 2F are scanning electron microscope (SEM) micrographs of CuO—CuO core-shell nanocomposites synthesized on a nickel foam substrate at increasing magnification.

FIGS. 3A and 3B are transmission electron microscope (TEM) micrographs of CuO nanoparticles synthesized on a nickel foam substrate at increasing magnification.

FIGS. 3C, 3D, and 3E are TEM micrographs of CuO—CuO core-shell nanocomposites synthesized on a nickel foam substrate at increasing magnification.

Similar reference characters denote corresponding features consistently throughout the attached drawings.

DETAILED DESCRIPTION OF THE PREFERRED EMBODIMENTS

Figure 1:
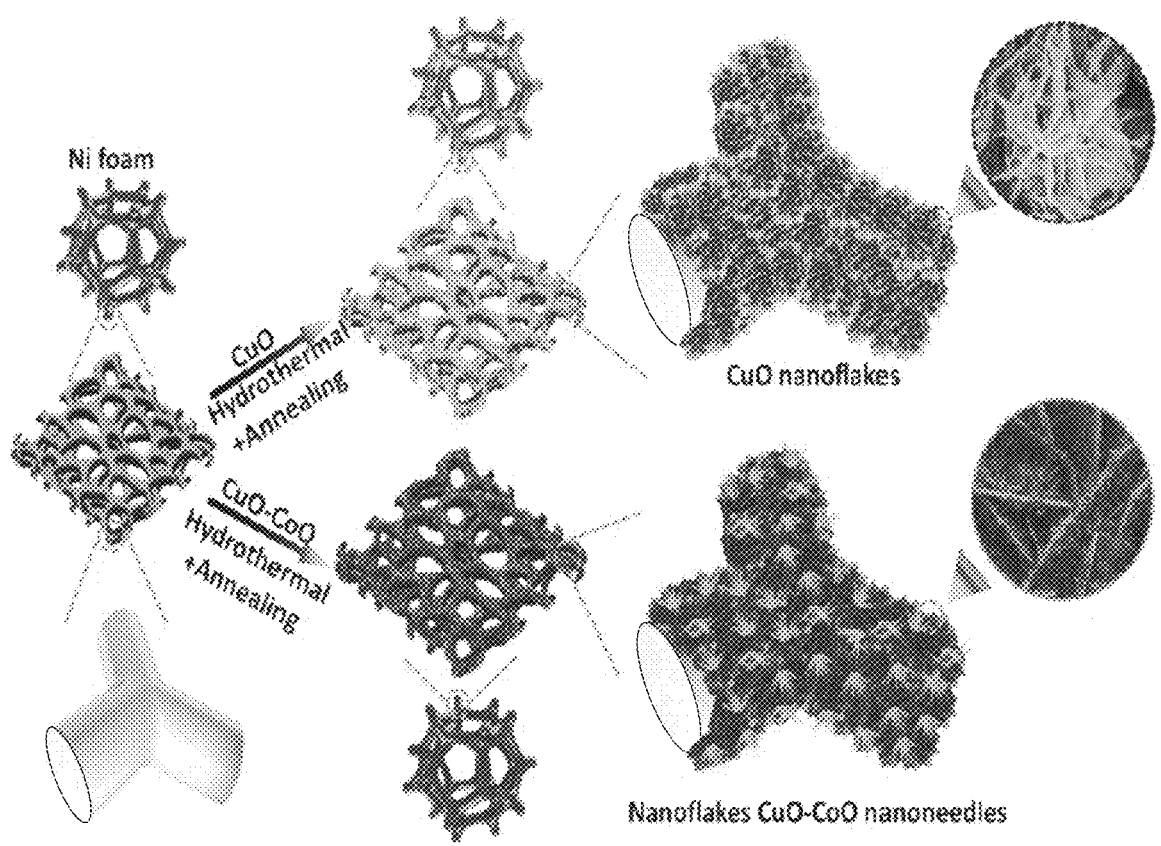
FIG. 1 is a pictorial diagram of fabrication of material for the positive electrode of a high-rate hybrid supercapacitor.

The high-rate hybrid supercapacitor (HSC) has a positive electrode made from copper oxide (CuO)-cobalt oxide (CoO) core-shell nanocactus-like heterostructures produced on a nickel foam substrate, a negative electrode made by coating nickel foam with graphene ink, and a separator of cellulose paper. The heterostructures each have a core of CuO nanoflakes and a shell of CoO nanoneedles extending from the nanoflakes. The HSC achieves a specific capacity of 173.9 mA h $g^{-1}$ at 1 A $g^{-1}$ and long cycle life with 94% retention over 5000 cycles at 4 A $g^{-1}$, and also exhibits a stable operating voltage window of 1.6 V, energy density of 56.5 W h $kg^{-1}$, and cycling stability of 98.8% retention with coulombic efficiency of 98.7% over 4000 cycles. The positive electrode material is made by heating nickel foam in an aqueous mixture of nitrate salts of copper and cobalt, urea, and ammonium fluoride at 150° C. for 5 hours, followed by annealing in nitrogen atmosphere.

The nanocactus-like CuO—CoO heterostructure material comprises CoO nanoneedles on a surface of CuO nanoflakes. As will be demonstrated in the following examples, the introduction of CoO nanoneedles on CuO nanoflakes offers enhanced electrochemical activity, increased active surface area, more numerous electroactive sites, and short ion transport pathways and high ionic mobility, resulting in higher utilization of active materials, and thus higher energy storage performance than either of the bulk materials or nanostructured materials alone. By combining nanostructured CuO and CoO in a hierarchical morphology, an electrode material with high energy storage performance is achieved.

The CuO—CoO heterostructure material includes synthesizing CoO nanoneedles directly on CuO nanoflakes via a facile single-step hydrothermal method. Although the exemplary electrodes were made on nickel foam (which is porous, providing a large surface area for deposition of the nanocomposite particles), it is anticipated that the substrate may be other porous conductive materials that are inert to $Cu^{2+}$ and $Co^{2+}$ and otherwise permit deposition and formation of the nanocomposite particles on its surface.

An exemplary high-rate HSC was found to exhibit excellent performance features such as a large operating potential window of 1.6 V; a high energy density of 56.5 W h $kg^{-1}$ at 831.9 W $kg^{-1}$; and superior cycling stability of 98.8% retention with 98.7% of columbic efficiency over 4000 cycles.

As used herein, a hierarchical nanostructure is an integrated architecture comprising nanoscale or low dimensional sub-units, including, for example, zero dimensional (0D) nanoparticles; one dimensional (1D) nanowires or nanotubes, or when grown to protrude from a substrate, nanoneedles, and two dimensional (2D) nanosheets or nanoflakes, in which these sub-units may be aligned or oriented in a well-ordered fashion.

Nanostructures refer to materials having a dimension on a scale ranging from 1 to 1000 nm. For example, a nanosheet or nanoflake is a nanostructure with at least one nanoscale dimension (thickness), i.e., a thickness on a scale ranging from 1 to 1000 nm. A nanoneedle is a nanostructure with two of three dimensions being nanoscale. Nanoneedles may be conical or tubular, and may be solid or hollow.

It should be understood that the amounts of materials for the methods described herein are exemplary, and appropriate scaling of the amounts may be made, so long as the relative ratio of materials is maintained. As used herein, the term "about," when used to modify a numerical value, means within ten percent of that numerical value.

The high-rate hybrid supercapacitor (HSC) will be better understood by reference to the following examples.

Example 1

Synthesis of CuO—CoO Nanocomposite and CuO Nanoparticle Electrode Material

Prior to the deposition of nanomaterials, Ni foam (1×3 $cm^2$) substrate was treated with 3 M HCl for 30 min to remove the oxide layer or any impurities present on the Ni foam surface. Nanocactus-like CuO—CoO structures are grown on the Ni foam via a facile hydrothermal route. Typically, 0.05 M $Cu(NO_3)_2.6H_2O$, 0.05 M $Co(NO_3)_2.6H_2O$, 0.1 M $CH_4N_2O$, and 0.2 M $NH_4F$ were mixed in 70 mL DI (deionized) water and stirred for 30 min. Subsequently, a 100 mL Teflon autoclave was filled with the above recipe and a piece of Ni foam and maintained at 150°

C. for 5 h. After 5 h, the Ni foam loaded with CuO—CoO electroactive material was rinsed with DI water several times, and then dried at 60° C. for 2 h. The heterostructure material was then annealed at 300° C. for 2 h in an $N_2$ environment, and then placed in air at 60° C. for 1 h. Using a similar preparation method, bare CuO nanoflake material was developed by omitting the cobalt nitrate hexahydrate during the synthesis. The mass loading of CuO—CoO heterostructure and CuO nanoflakes on the Ni foam were approximately to be 4 and 3 mg $cm^{-2}$, respectively.

Example 2

Properties of Electrode Materials

The morphology, structure, crystal structure, elemental composition and surface area of the as-synthesized materials were analyzed using scanning electron microscopy (SEM, S-4800), X-ray diffraction (XRD, D/Max-2400) and X-ray photoelectron spectroscopy (XPS, ESCALAB 250), transmission electron microscope (TEM, CJ111) and Brunauer-Emmett-Teller (BET, ASAP 2020). The SEM, XRD, XPS, TEM and $N_2$ adsorption-desorption measurements were conducted using active material loaded on Ni-foam substrate, prepared as above.

Electrochemical measurements were performed on the exemplary materials and were evaluated in an aqueous 3 M KOH solution using a three electrode setup, where a Pt wire and an Ag/AgCl electrode were used as counter and reference electrodes, respectively. An exemplary HSC was fabricated using the sample material prepared as above as the cathode, an anode fabricated by coating Ni foam with commercially available graphene ink (G-ink) slurry and dried overnight at 100° C., and cellulose paper separator. Aqueous potassium hydroxide was used as the electrolyte. Finally, the HSC was fabricated by combining the cathode electrode of CuO—CoO heterostructure and anode electrode of G-ink with filter paper in 3 M KOH solution. Afterward, the assembled HSC was sealed carefully using parafilm to achieve a stable response. The specific capacity ($C_{SC}$), energy density (E) and power density (P) were obtained based on the following equations:

$$C_{SC} = \frac{I \cdot \Delta t}{m \cdot 3.6}, \qquad (1)$$

$$E = \frac{I \cdot \int V(t)dt}{M \cdot 3.6}, \qquad (2)$$

$$P = \frac{3600 \cdot E}{\Delta t_s}, \qquad (3)$$

where l (A), $\Delta t$ (s), m (g), M (g) and V (V) are the discharge current, discharge time, mass of the active material, and applied voltage, respectively.

The fabrication of the CuO and core-shell-like CuO—CoO nanostructures on the Ni foam through the facile one-step hydrothermal reaction is schematically illustrated in FIG. 1. The mechanism of the method forming the present heterostructure is presumably as follows. Presumably, $NH_4F$ produces fluoride ($F^-$) anions and urea releases carbonate ions ($CO_3^{2-}$), as well as hydroxyl ions ($OH^-$). During the hydrothermal process, the $Cu(NO_3)_2.6H_2O$ and $Co(NO_3)_2.6H_2O$ salts produce nitrate ions ($NO_3^-$) and $OH^-$ ions. The $Cu^{2+}$ and $Co^{2+}$ species react with the liberated $OH^-$ ions from both metallic salts and urea, which yields the formation of bimetallic (Cu and Co) hydroxides. The thermal treatment converts the bimetallic (Cu and Co hydroxides) into the CuO—CoO heterostructure. In terms of CuO, interconnected CuO nanoflakes alone may be grown homogeneously on the entire Ni foam surface. The CuO—CoO heterostructure formed on Ni foam as above results in a structure for which all CoO nanoneedles grow on a surface of CuO nanoflakes to form the hierarchical core-shell CuO—CoO nanocomposite structure. This material as an electrode greatly improves surface area and offers more electroactive sites to elevate the energy storage performance during the reversible redox reaction.

The morphology of the as-fabricated electrodes was first evaluated using SEM. FIGS. 2A-2C and 2D-2F are the SEM micrographs of the CuO and CuO—CoO films, respectively, on Ni foam at various magnifications. The SEM micrographs (FIGS. 2A-2C) reveal that the as-fabricated CuO takes the form of nanoflakes that are interconnected with each other, and these nanoflakes agglomerate to a porous 3D architecture. The thickness of the exemplary nanoflakes was found to be in the range of 22.9 to 28 nm. After the introduction of Co, a layer of CoO nanoneedles were grown on each CuO nanoflake surface, resulting in a core-shell hierarchical nanocactus-like structure (FIGS. 2D-2F). Furthermore, the morphologies and structures of the CuO nanoflakes and core-shell CuO—CoO electrodes were examined through TEM, HR-TEM and scanning TEM (STEM) (see FIGS. 3A-3K). In the exemplary CuO—CoO electrode, the thickness of the CuO nanoflakes was found to be in the range of 101 nm to 123.6 nm. The length and thickness of the CoO nanoneedles on CuO nanoflakes were found to be in the range of 0.27-1.3 µm and 25-71 nm, respectively.

Figures 3F, 3G:
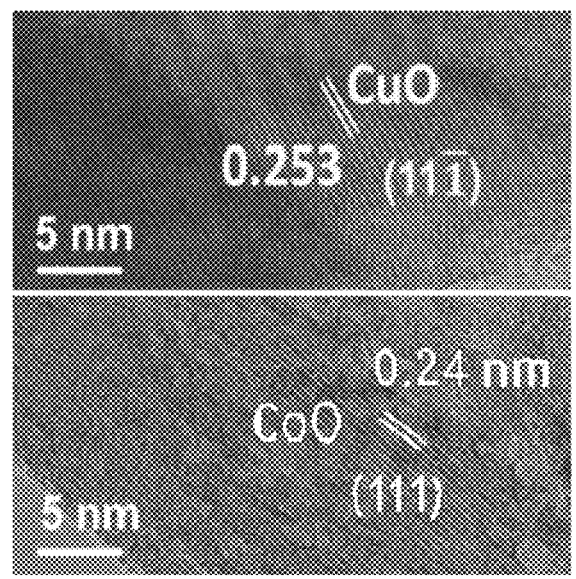
FIG. 3F is a high resolution transmission electron microscope (HRTEM) micrograph of CuO—CuO core-shell nanocomposites synthesized on a nickel foam substrate taken from area 3F of FIG. 3D.
FIG. 3G is a high resolution transmission electron microscope (HRTEM) micrograph of CuO—CuO core-shell nanocomposites synthesized on a nickel foam substrate taken from area 3G of FIG. 3E.
Figure 3H:
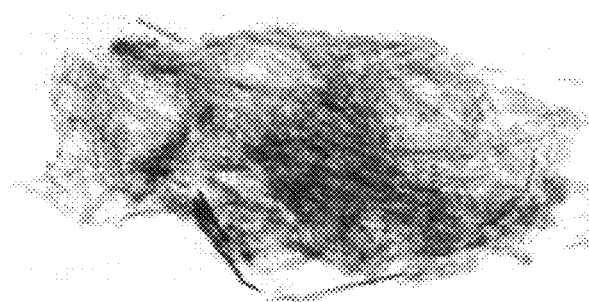
FIG. 3H is a scanning transmission electron microscope (STEM) micrograph of CuO—CuO core-shell nanocomposites synthesized on a nickel foam substrate.
Figure 3I:
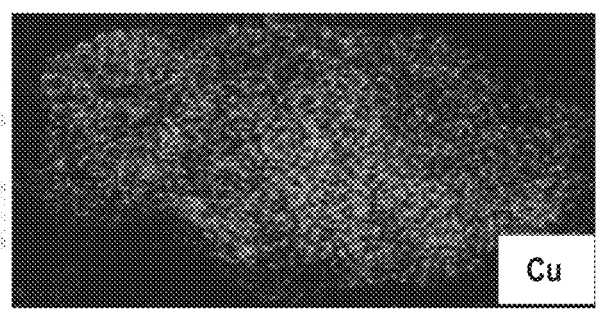
FIG. 3I is a scanning transmission electron microscope (STEM) micrograph of CuO—CuO core-shell nanocomposite synthesized on a nickel foam substrate showing relative elemental mapping of copper (Cu) in the nanocomposite.
Figure 3J:
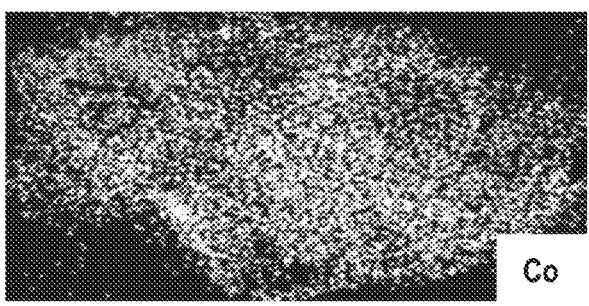
FIG. 3J is a scanning transmission electron microscope (STEM) micrograph of CuO—CuO core-shell nanocomposite synthesized on a nickel foam substrate showing relative elemental mapping of cobalt (Co) in the nanocomposite.
Figure 3K:
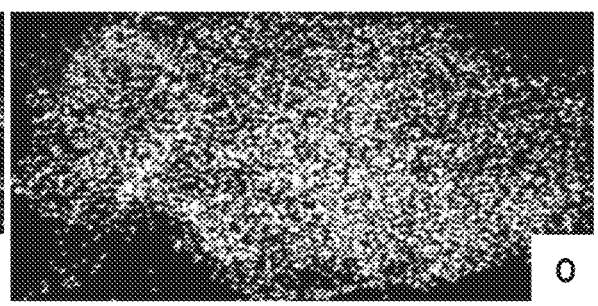
FIG. 3K is a scanning transmission electron microscope (STEM) micrograph of CuO—CuO core-shell nanocomposite synthesized on a nickel foam substrate showing relative elemental mapping of oxygen (O) in the nanocomposite.

As shown in FIGS. 3A-3B, the as-synthesized CuO material alone had a nanoflake morphology with a smooth surface, consistent with the SEM analysis demonstrated in FIGS. 2A-2C. FIGS. 3C-3E show the TEM images of the exemplary nanocactus-like CuO—CoO heterostructure. The CoO nanoneedles of the exemplary heterostructure densely cover the CuO nanoflake surface. HR-TEM images in FIGS. 3F-3G show the lattice fringes with spacing of 0.253 and 0.24 nm, which is ascribed to the (11$\bar{1}$) and (111) planes of CuO and CoO phases, respectively. The elemental mapping images (FIGS. 3H-3K) clearly demonstrate the uniform distribution of Cu, Co and O signals in the as-prepared heterostructure material.

Figure 4A:
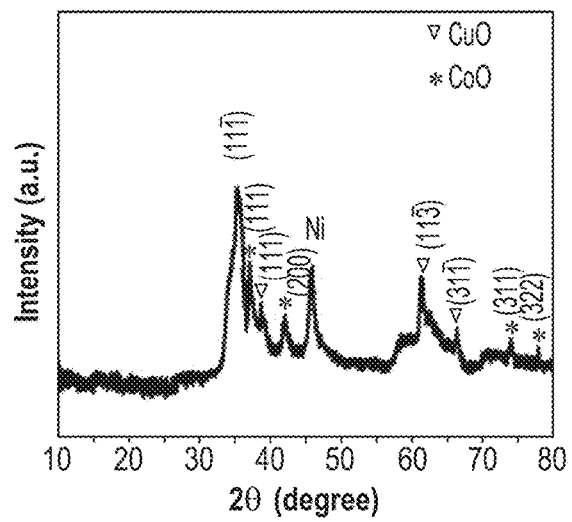
FIG. 4A is an XRD diffractogram for CuO—CoO nanocomposite material on a nickel foam substrate.
Figure 4B:
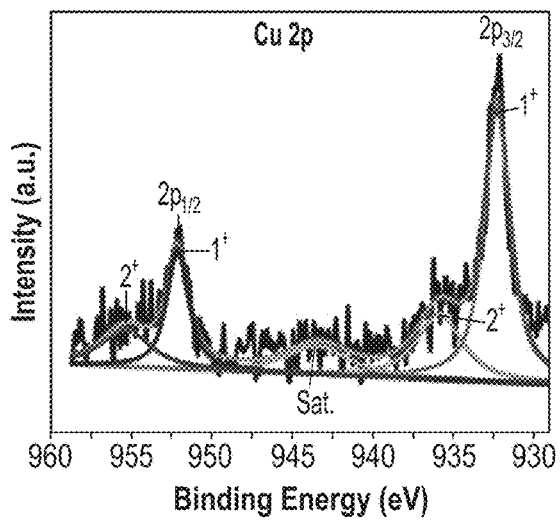
FIG. 4B is the X-ay photoelectron spectroscopy (XPS) spectrum for Cu 2p in CuO—CoO nanocomposite material on a nickel foam substrate.
Figure 4C:
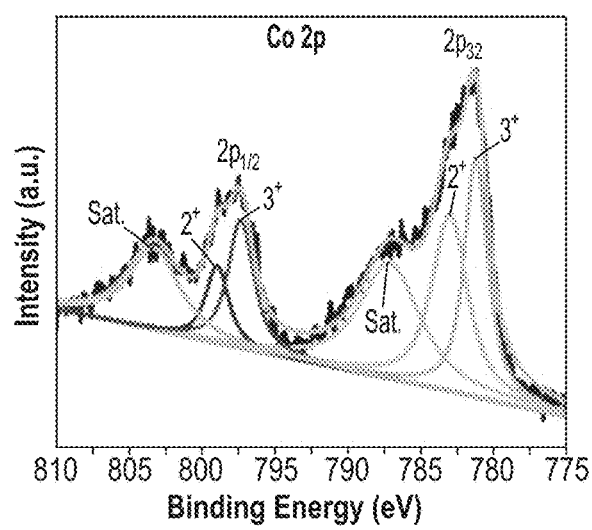
FIG. 4C is the X-ay photoelectron spectroscopy (XPS) spectrum for Co 2p in CuO—CoO nanocomposite material on a nickel foam substrate.
Figure 4D:
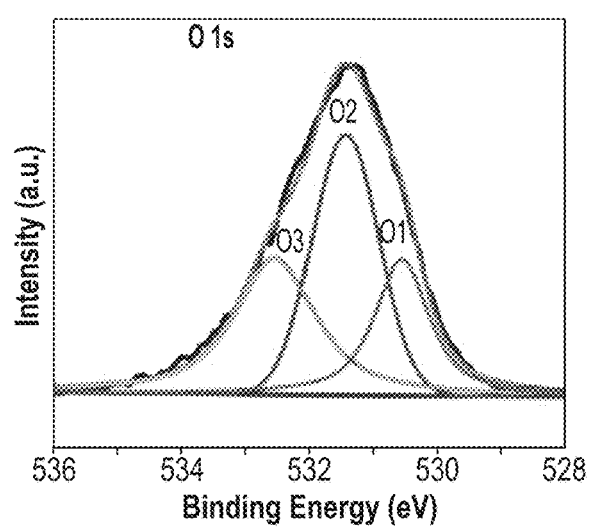
FIG. 4D is the X-ay photoelectron spectroscopy (XPS) spectrum for 0 is in CuO—CoO nanocomposite material on a nickel foam substrate.

The structure and crystallographic phases of the as-prepared heterostructure were identified by XRD analysis. The resulting diffraction pattern is depicted in FIG. 4A. For the CuO alone sample, all diffraction peaks are consistent with the monoclinic CuO phase (JCPDS: 48-1548) without any impurity peaks. Ni peaks appearing in the XRD spectra arise from the Ni foam substrate. However, in the as-prepared heterostructure electrode, diffraction peaks appear at 35.3°, 38.6°, 61.3° and 66.2°, corresponding to the (11$\bar{1}$), (111), (11$\bar{3}$), and (31$\bar{1}$) crystal planes of the monoclinic CuO phase (JCPDS: 48-1548), and also appear at 36.7°, 42.0, 73.8° and 77.8°, corresponding to (111), (200), (311) and (222) crystal planes of the cubic CoO phase (JCPDS: 75-0393). The presence of Ni in the survey spectrum is again due to the Ni foam substrate. Deconvoluted peaks of Cu 2p at 932.1 eV and 952.1 eV in FIG. 4B are ascribed to $Cu^+$, while the peaks at 935.9 and 955.45 eV with one shake-up satellite peak are ascribed to $Cu^{2+}$. The high-resolution Co 2p spectrum shown in FIG. 4C shows the fitting peaks at 781.3 eV and 797.4 eV are ascribed to $Co^{3+}$, while the peaks at 783.1 and 799.0 eV are ascribed to $Co^{2+}$. The O 1s in the XPS spectrum can be fitted by three peaks centered at 530.5 eV (O1), 531.4 eV (O2) and 532.5 eV (O3) (FIG. 4D), corresponding to oxygen ions in the coordination states at the surface of the heterostructure, lattice oxygen associated with Cu—O and Co—O, and chemisorbed and physisorbed water on or within the surface, respectively. The XRD and XPS results confirm the co-existence of CuO and CoO in the hetero structure.

Figure 4E:
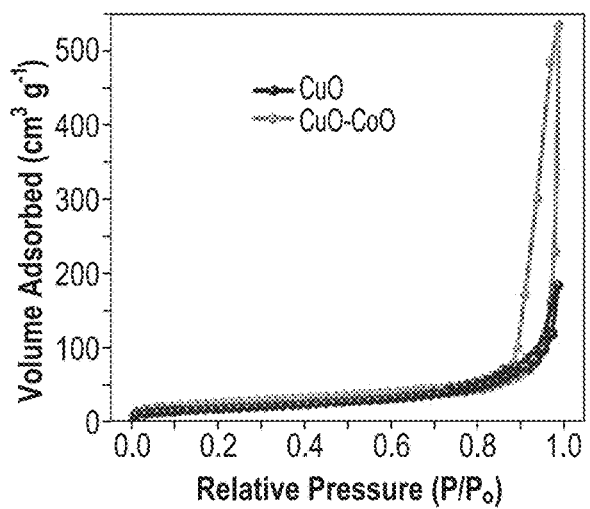
FIG. 4E are $N_2$ isotherms for pure CuO nanoparticles and CuO—CoO nanocomposites, respectively, on a nickel foam substrate.
Figure 4F:
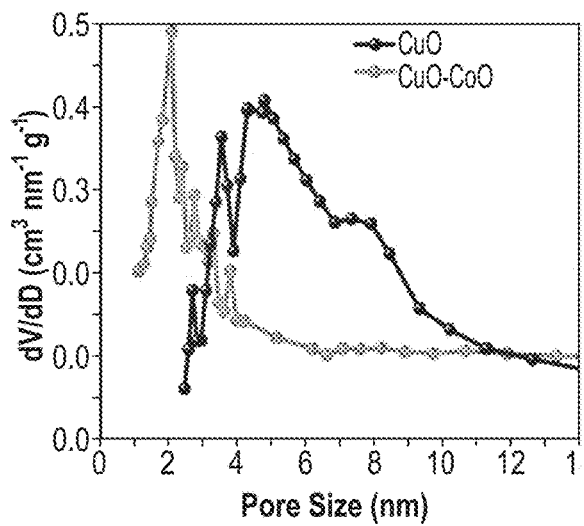
FIG. 4F is a plot comparing $N_2$ desorption as a function of pore size for pure CuO nanoparticles and CuO—CoO nanocomposites, respectively, on a nickel foam substrate.

The surface area and porosity of the exemplary bare CuO and nanocactus-like CuO—CoO heterostructure electrodes were evaluated by $N_2$ adsorption-desorption measurements (FIGS. 4E, 4F). The specific surface of the CuO—CoO electrode (149 $m^2 g^{-1}$) is much higher than the CuO electrode (73 $m^2 g^{-1}$) (FIG. 4E). The pore size distribution is determined by the Barrett, Joyner, and Halenda (BJH) method. The resulting data, as shown in FIG. 4F, suggests that the pore size ranges from 1.1 to 6.9 nm for the CuO—CoO heterostructure electrode and 2.4 to 10.1 nm for the bare CuO electrode. These results indicate both as-fabricated electrodes have a mesoporous structure. The mesoporous structures and relatively high specific surface area of the CuO—CoO electrodes presumably contributes to the high number of active sites for facilitating electrochemical reactions, which enhances energy storage performance.

Figure 5A:
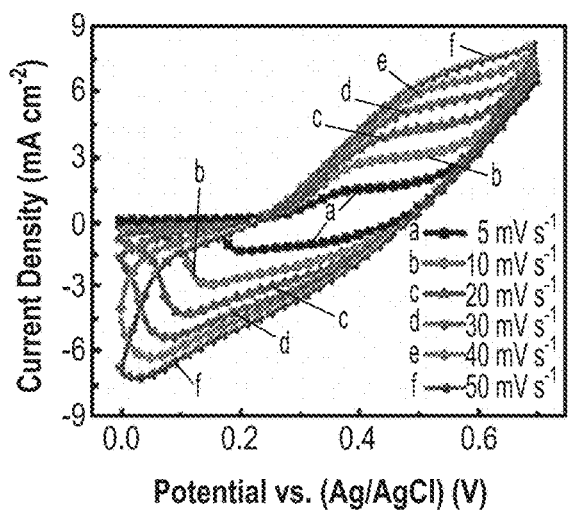
FIG. 5A is a cyclic voltammogram for a CuO electrode at various scan rates.
Figure 5B:
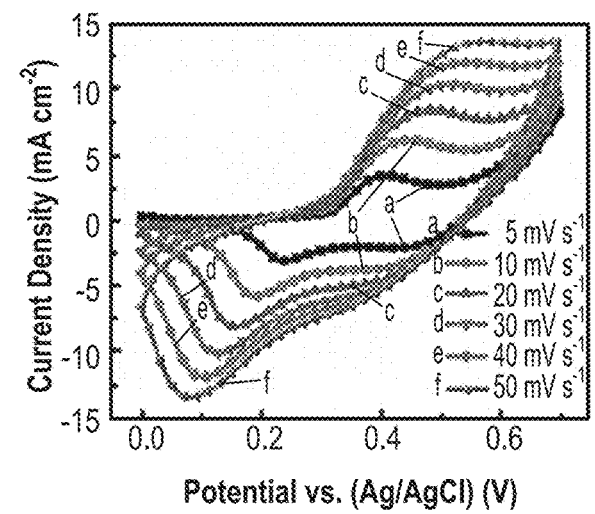
FIG. 5B is a cyclic voltammogram for a CuO—CoO core-shell nanocomposite electrode at various scan rates.

The electrochemical behaviors of the as-developed samples were investigated using a three-electrode setup in a 3 M KOH electrolyte, with an Ag/AgCl reference electrode. FIGS. 5A, 5B show resulting cyclic voltammetry (CV) plots of the exemplary CuO electrode and CuO—CoO heterostructure electrode in the potential range of 0-0.7 V (relative to the Ag/AgCl reference) at the various scan rates. The exemplary bare CuO and CuO—CoO heterostructure electrodes display a pair of redox peaks, which indicates a reversible Faradic redox reaction related to M—O/M—O—OH (M denotes Cu or Co ions) associated with $OH^-$ (eqn. (4) and (5)), typical of battery-type electrodes. All the CV plots exhibit similar CV shapes without any distortion, even at high scan rates, indicating high reversibility of the active material. Notably, all of the CuO—CoO heterostructure-based electrodes exhibit larger integrated CV areas than the bare CuO electrode, implying an enhanced specific capacitance after incorporation of CoO in the present nanocactus-like heterostructure.

$$CuO + OH^- \leftrightarrow CuOOH + e^- \quad (4)$$

$$CoO + OH^- \leftrightarrow CoOOH + e^- \quad (5)$$

The charge storage behavior of the as-prepared electrodes were demonstrated using the power law $i_p = a \cdot v^b$, where, $i_p$ is the cathodic peak response and v is the scan rate). The b-value can be obtained by fitting for the slope of the log(v)-log(i) plots. The b-value was found to be in the range of 0 to 1 (0<b<1). In detail, a b-value of 1.0 denotes a capacitive process, while 0.5 represents a diffusion response. The b-values for the exemplary bare CuO and CuO—CoO heterostructure electrodes are 0.613 and 0.644, respectively, which are near 0.5, indicating a diffusion-controlled response of the redox process, i.e., or battery-type behavior. The larger b-value of the CuO—CoO heterostructure over the bare CuO electrode suggests that the CuO—CoO heterostructure supports more rapid charge transfer, consistent with the higher energy storage performance.

Figure 5C:
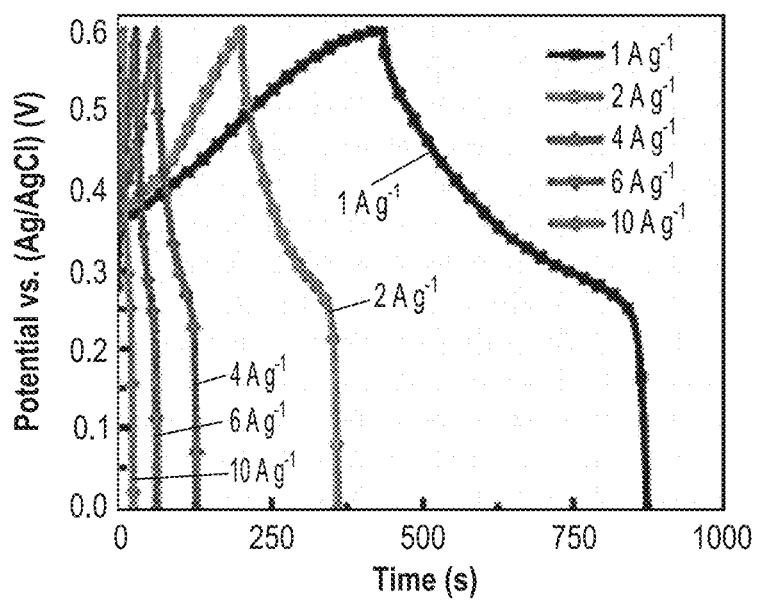
FIG. 5C is a plot of galvanic charge/discharge curves at various current densities for a CuO electrode and FIG. 5D is a plot of galvanic charge/discharge curves at various current densities for a CuO—CoO core-shell nanocomposite electrode.
Figure 5D:
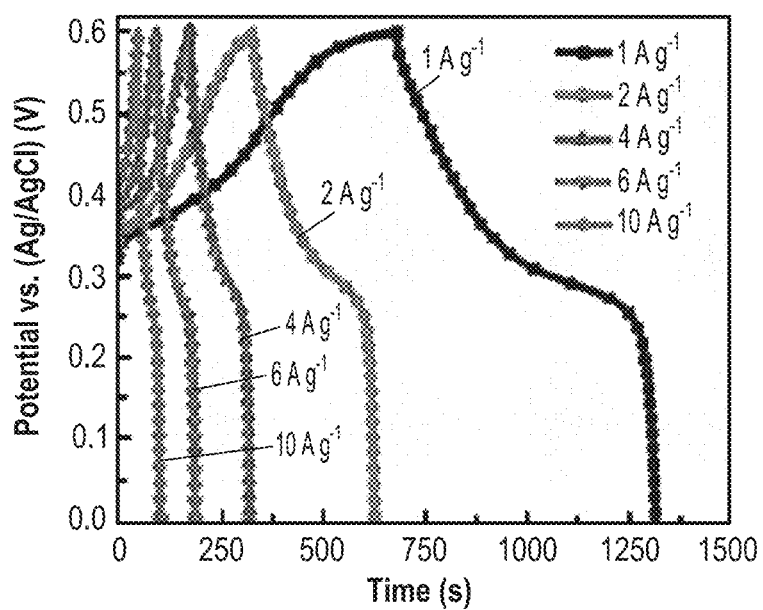
Figure 5E:
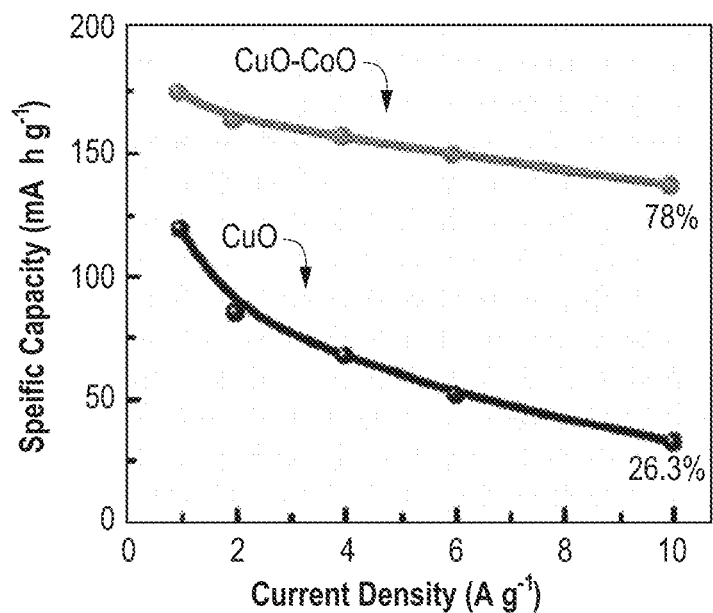
FIG. 5E is a plot comparing the specific capacity of a CuO electrode with a CuO—CoO core-shell nanocomposite electrode.

FIGS. 5C and 5D show the galvanostatic charge/discharge (GCD) curves for the exemplary bare CuO and CuO—CoO heterostructure electrodes, respectively, operated over 0-0.6 V at various current densities. The GCD plots show flat voltage plateaus, substantiating battery-type behavior of the exemplary bare CuO and CuO—CoO heterostructure electrodes. The exemplary CuO—CoO heterostructure electrode exhibited longer charge-discharge duration compared to the bare CuO electrode. The specific capacities of the exemplary electrodes were estimated from the GCD plots. The specific capacities of the CuO—CoO heterostructure electrodes were measured to be 173.9, 162.5, 155.9, 148.4 and 135.7 mA h $g^{-1}$ at 1, 2, 3, 4, 5, and 10 A $g^{-1}$, respectively (FIG. 5E). The specific capacity of the bare CuO electrode was consistently lower at 119.5, 85.4, 67.6, 51.2 and 31.4 mA h $g^{-1}$, respectively. The exemplary CuO—CoO heterostructure electrode achieves a 78% rate capability, which is superior to the exemplary bare CoO electrode rate capability of 26.3%. The higher energy storage behavior of the exemplary CuO—CoO heterostructure is presumably due to the CoO nanoneedles disposed on CuO nanoflakes improving electrochemical activity, increasing active surface area and electroactive sites, and shortening ion transport pathways relative to the individual materials.

Figure 5F:
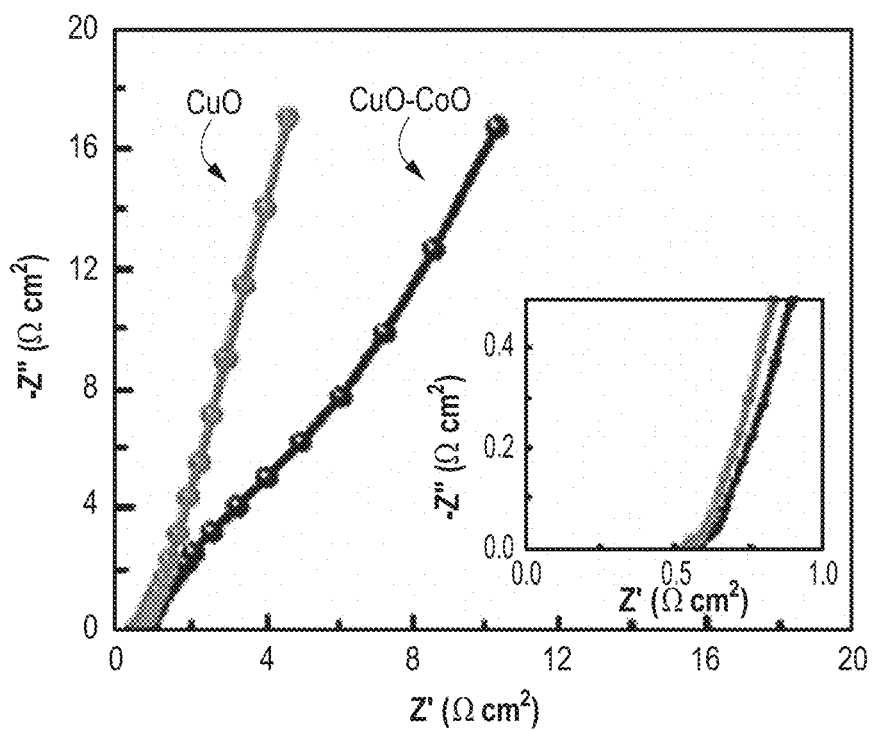
FIG. 5F is a plot comparing the Nyquist plot of a CuO electrode with the Nyquist plot of a CuO—CoO core-shell nanocomposite electrode.

To examine the higher energy storage performance of hybrid material, electrochemical impedance spectroscopy (EIS) tests were conducted over a frequency range of 0.01 to 100 kHz at 5 mV amplitude, as shown in FIG. 5F. The EIS plots were fit by an equivalent circuit, which includes a charge transfer resistance ($R_{ct}$) at the high-frequency region and a linear Warbur-impedance at medium or low frequency regions. As expected, the $R_{ct}$ of CuO—CoO (0.02 $\Omega cm^2$) is lower than that of bare CuO (0.06 $\Omega cm^2$), which further confirms the excellent conductivity of the CuO—CoO heterostructure electrode. Moreover, the CuO—CoO heterostructure electrode delivers a steeper curve in the EIS test relative to the bare CuO electrode, indicating more efficient ion diffusion in the electrolyte during the redox reaction for the CuO—CoO heterostructure electrode. These results indicate that the charge transfer ability of bare CuO is enhanced by the incorporation of the CoO material in the hybrid material.

Figure 6A:
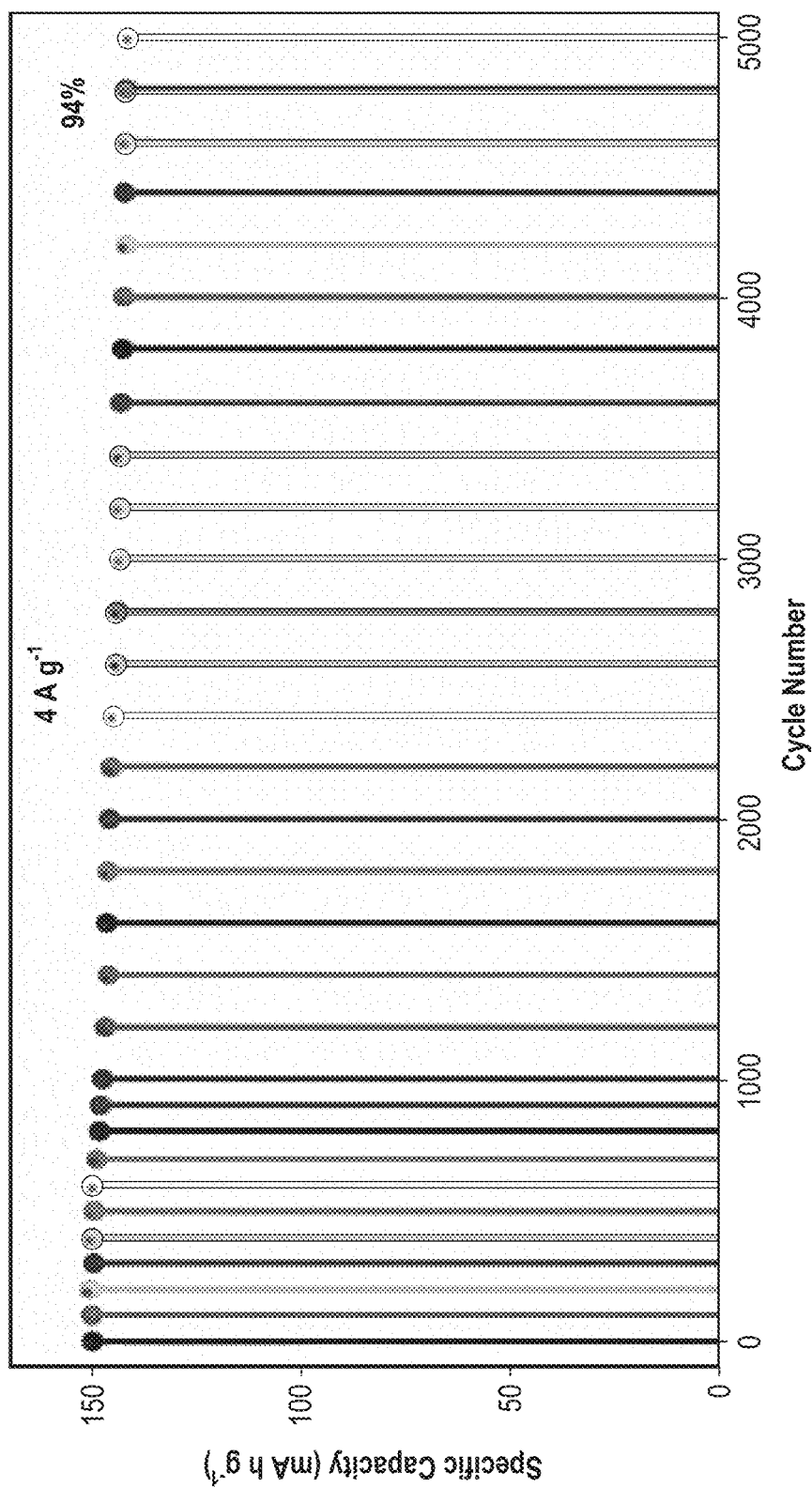
FIG. 6A is a plot of specific capacity as a function of cycle number for a CuO—CoO core-shell nanocomposite electrode over 5000 cycles at 4 A $g^{-1}$.
Figure 6B:
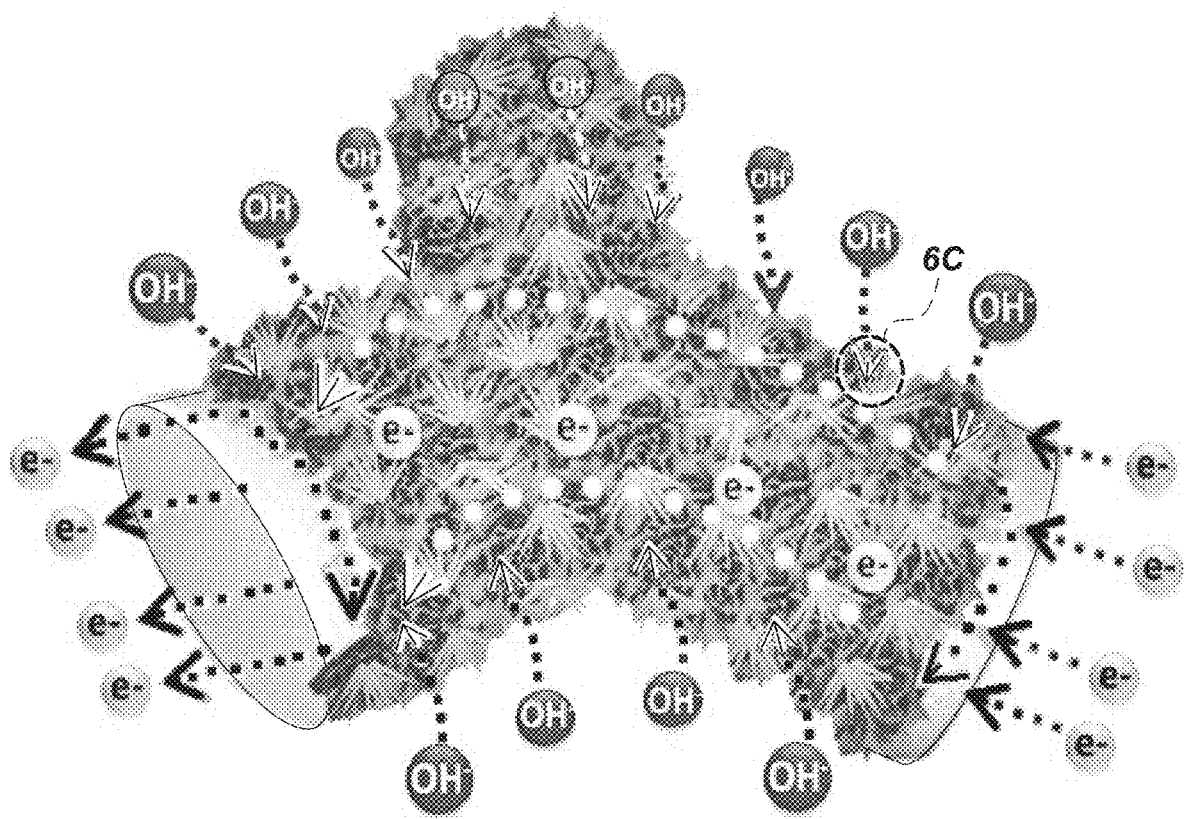
FIG. 6B is a pictorial diagram schematically illustrating a proposed mechanism for electrolyte ion transport in a CuO—CoO core-shell nanocomposite electrode.
Figure 6C:
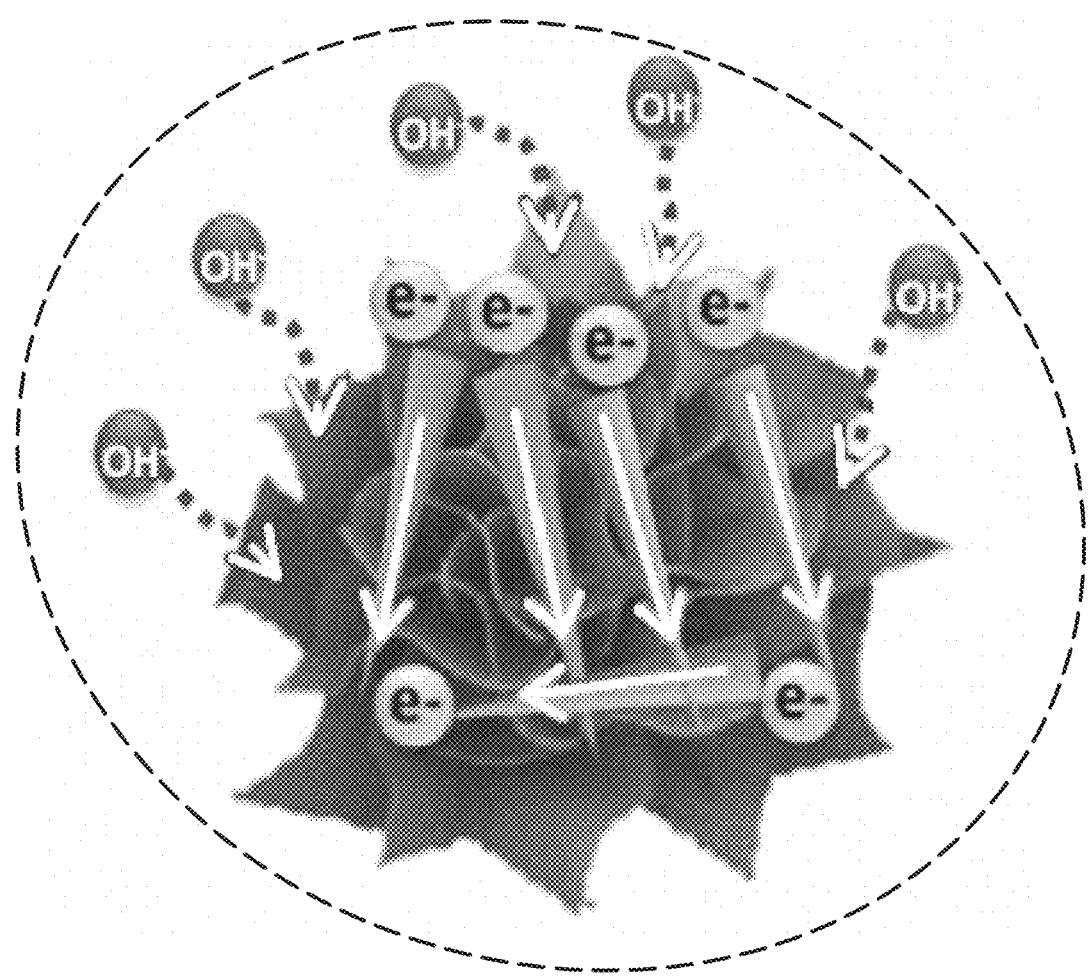
FIG. 6C is a detail view of area 6C of FIG. 6B.

Long-term cycling performance is a crucial factor for commercialization of SCs. FIG. 6A shows the cycling behavior of the exemplary CuO—CoO heterostructure electrode at 4 A $g^{-1}$ over 5000 cycles. FIG. 6A shows a slight improvement in specific capacity during initial cycles, which may be attributed to activation of the electrode material. Even after 5000 cycles, the exemplary CuO—CoO heterostructure electrode retained 94% of its initial capacitance, indicating good stability. Table 1 lists the morphologies, synthetic technique and electrochemical performances of various existing transition metal oxide (TMO) electrodes reportedly used in supercapacitor applications in the published literature. Based on the data shown in Table 1, the present CuO—CoO heterostructure material delivers higher energy storage over the other studied materials. This could be explained by reference to the schematic of ion transport mechanism in FIGS. 6B and 6C. First, direct attachment of CuO nanoflakes on Ni foam provides good electrical contact, which facilitates transportation of electrolyte ions. Second, the uniform hierarchical nanoflake array provides abundant electroactive sites, yielding high capacity. The CoO nanoneedles shorten the charge diffusion pathways for rapid electrolyte diffusion into the CuO nanoflake interiors, improving energy storage performance.

TABLE 1

Comparison of present CuO-CoO heterostructure material with other supercapacitor electrode materials

| Morphology | Synthesis method | Specific capacity (mA h g$^{-1}$) | Cycling stability (Cycles) |
|---|---|---|---|
| Fe—Ni—Co oxide nanoflake arrays | Hydrothermal | 108.3 at 1 g$^{-1}$ | 92.3% (10,000) |
| Hollow NiCo$_2$O$_4$ nano-sphere | Ultrasonic spray pyrolysis | 139.9 at 5 A g$^{-1}$ | >100% (1000) |
| NiCo$_2$O$_4$@MnO2 hybrid nanosheet networks | Electrodeposition process | 126.8 at 0.5 A g$^{-1}$ | 87.1% (3000) |
| MnCo$_2$O$_4$@MnO$_2$core-shell nanowire arrays | Hydrothermal | 143 at 1 A g$^{-1}$ | 88% (3000) |
| Flower-like ZnO@MnCo$_2$O$_4$ nanosheets | Hydrothermal | 140.2 at 1 A g$^{-1}$ | 93.5% (1000) |
| NiCo$_2$O$_4$ nanorod/graphene oxide | Hydrothermal | 88.7 at 1 A g$^{-1}$ | 84.7% (3000) |
| Flower-like CuCo$_2$S$_4$/CuCo$_2$O$_4$ heterostructure | Hydrothermal | 166.6 at 1 A g$^{-1}$ | 81% (5000) |
| Mn$_3$O$_4$/Ni(OH)$_2$ nanocomposites | Hydrothermal | 166.9 at 1 A g$^{-1}$ | 89% (2000) |
| CuCo$_2$O$_4$ maguey-like nanowires | Hydrothermal | 122.7 at 1.5 A g$^{-1}$ | 100.94% (3000) |
| Corn-like CuCo$_2$O$_4$nanoforests | Hydrothermal | 91.1 at 2 mA cm$^{-2}$ | 94% (1500) |
| Hollow NiSe-CoSe nanoparticles | Hydrolysis process | 162.2 at 1 A g$^{-1}$ | 83.3% (1000) |
| Nanocactus-like CuO-CoO core-shell nanostructures | Hydrothermal | 173.9 at 1 A g$^{-1}$ | 94% (5000) |

Example 3

Hybrid Supercapacitor (HSC) Device

To illustrate the electrochemical behavior of the CuO—CoO heterostructure electrode in a practical application, a HSC was fabricated to have the CuO—CoO heterostructure electrode as a positive electrode, commercially available graphene-ink (G-ink) on Ni foam as a negative electrode and cellulose paper as a separator. The HSC is shown diagrammatically in FIG. 7, along with a Ragone plot comparing performance of the hybrid supercapacitor with prior supercapacitors. To attain the high-performance of the HSC, the weight of both electrodes was balanced prior to making the device via equation (6):

$$\frac{m^+}{m^-} = \frac{C_{sc}^- \times \Delta V^-}{Q^+}, \quad (6)$$

where $m^+$ is the active mass of the positive electrode, $Q^+$ is the charge on the positive electrode, $m^-$ is the active mass of the negative electrode, $C_{SC}^-$, is the specific capacitance of the negative electrode, and $\Delta V^-$ is the potential difference of the negative electrode. The positive to negative electrode mass ratio obtained from Eq. (6) is 0.873. The G-ink negative electrode delivered a voltage window of −1.0 to 0 V, while the CuO—CoO heterostructure positive electrode delivered a voltage window of 0 to 0.7 V, thus affording an operating voltage window of 0 to 1.6 V for the exemplary high energy density HSC. CV plots of the HSC at a scan rate of 5 mV s$^{-1}$ confirmed the operating window of 0 to 1.6V for the HSC.

CV profiles of the HSC in the potential range of 0-1.6 V at different scan rates were obtained. With increasing scan rates, the CV curves show redox peaks and also maintain similar CV shapes, demonstrating a good reversibility. Further, GCD plots of the HSC were obtained at different current densities. The GCD profiles exhibit the symmetrical response, which indicates the better electrochemical reversibility and columbic efficiency of the HSC.

Figure 7:
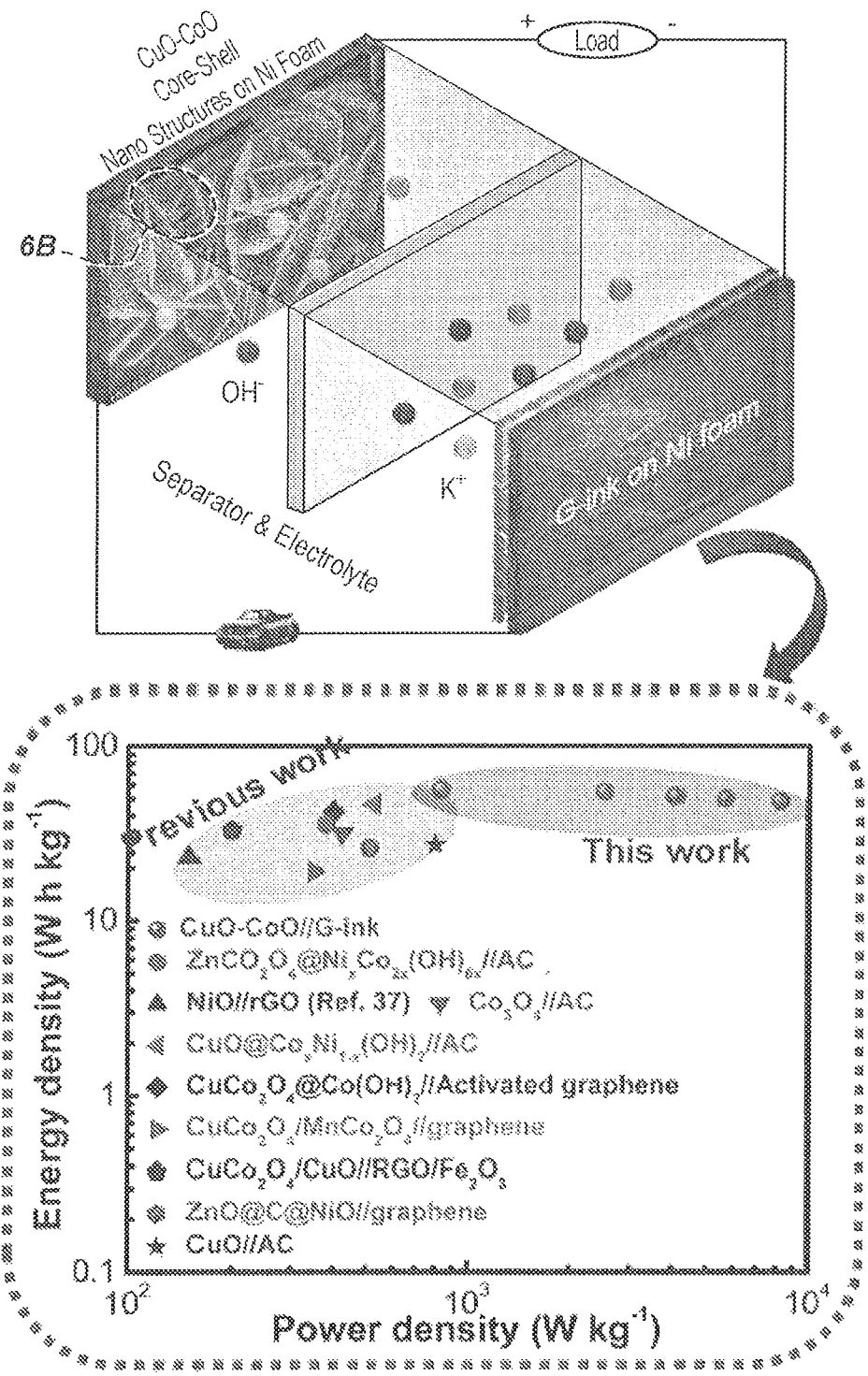
FIG. 7 is a pictorial diagram schematically illustrating a hybrid supercapacitor made with a CuO—CoO core-shell nanocomposite electrode and a Ragone plot comparing performance of the hybrid supercapacitor with prior supercapacitors.

The specific capacity values of the HSC were calculated as 67.9, 65.4, 63.6, 61.9 and 58.8 mA h g$^{-1}$ for current densities of 1, 3, 5, 7, and 10 A g$^{-1}$, respectively, revealing a good rate capability of 86.5%. The Ragone plot of FIG. 7 shows that the exemplary HSC delivered a maximum energy density of 56.5 W h kg$^{-1}$ at a power density of 831.9 W kg$^{-1}$, and maintained 48.5 W h kg$^{-1}$ at a maximum power density of 8230.7 W kg$^{-1}$. The achieved energy density of the HSC is considerably higher than many systems reported previously, including ZnCo$_2$O$_4$@NixCo$_{2x}$(OH)$_{6x}$//AC (26.2 W h kg$^{-1}$ at 511.8 W kg$^{-1}$), NiO//rGO (23.25 W h kg$^{-1}$ at 151 W kg$^{-1}$), Co$_3$O$_4$//AC (31.7 W h kg$^{-1}$ at 424.3 W kg$^{-1}$), CuO@Co$_x$Ni$_{1-x}$(OH)$_2$//AC (46.5 W h kg$^{-1}$ at 526.9 W kg$^{-1}$), CuCo$_2$O$_4$@Co(OH)$_2$//Activated graphene (19.2 W h kg$^{-1}$ at 350 W kg$^{-1}$), CuCo$_2$O$_4$/MnCo$_2$O$_4$/graphene (42.1 W h kg$^{-1}$ at 400 W kg$^{-1}$), CuCo$_2$O$_4$/CuO//RGO/Fe$_2$O$_3$ (33 W h kg$^{-1}$ at 200 W kg$^{-1}$), ZnO@C@NiO//graphene (35.7 W h kg$^{-1}$ at 380.9 W kg$^{-1}$), and CuO//AC (27.27 W h kg$^{-1}$ at 800 W kg$^{-1}$).

Cycling stability is important for implementation of HSCs in practical applications. GCD experiments at 5 A g$^{-1}$ showed that the HSC delivers 97.3% capacitance retention and 99.8% columbic efficiency even after 4000 cycles, evincing very high cycling stability and reversibility of device. EIS spectra obtained before and after the cycling experiments showed only small changes, further confirming stability of the HSC. The excellent performance is believed to result from the high surface area and the synergistic effect of the CuO—CoO nanocomposite heterostructure, which performed quite effectively in combination with the graphene-ink electrode.

It is to be understood that the high-rate hybrid supercapacitor is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A high-rate hybrid supercapacitor, comprising:
   a positive electrode, the positive electrode being a porous conductive substrate having a uniform coating of core-shell CuO—CoO nanocomposite particles distributed thereon;
   a negative electrode, the negative electrode being a porous conductive substrate coated with graphene ink;
   a separator disposed between the positive electrode and the negative electrode; and
   an electrolyte, the positive electrode, the negative electrode and the separator each having a portion thereof in contact with the electrolyte.

2. The high-rate hybrid supercapacitor according to claim 1, wherein said core-shell CuO—CoO nanocomposite particles each comprise a CuO nanoflake core and a shell of CoO nanoneedles extending from and around the CuO nanoflake core.

3. The high-rate hybrid supercapacitor according to claim 2, wherein the CuO nanoflake core of each of said nanocomposite particles has a thickness between 101 nm and 123.6 nm.

4. The high-rate hybrid supercapacitor according to claim 2, wherein the CoO nanoneedles of said nanocomposite particles have a length between 0.27 μm and 1.3 μm and a thickness between 25 nm and 71 nm.

5. The high-rate hybrid supercapacitor according to claim 1, wherein said porous conductive substrate of at least said positive electrode comprises nickel foam.

6. The high-rate hybrid supercapacitor according to claim 5, wherein said porous conductive substrate of said negative electrode comprises nickel foam.

7. The high-rate hybrid supercapacitor according to claim 1, wherein said electrolyte comprises an aqueous solution of potassium hydroxide.

8. The high-rate hybrid supercapacitor according to claim 1, wherein said positive electrode is mesoporous, having pore sizes between 1.1 nm and 6.9 nm.

9. A high-energy storage heterostructured material for a supercapacitor electrode, comprising core-shell nanocomposite particles having a CuO nanoflake core and a shell of CoO nanoneedles extending from and around the CuO nanoflake core.

10. The high-energy storage heterostructured material according to claim 9, wherein the CuO nanoflake core of each of said nanocomposite particles has a thickness between 101 nm and 123.6 nm.

11. The high-energy storage heterostructured material according to claim 9, wherein the CoO nanoneedles of said nanocomposite particles have a length between 0.27 μm and 1.3 μm and a thickness between 25 nm and 71 nm.

12. The high-energy storage heterostructured material according to claim 9, further comprising a porous conductive substrate, the core-shell nanocomposite particles uniformly coating the porous conductive substrate.

13. The high-energy storage heterostructured material according to claim 12, wherein the porous conductive substrate comprises nickel foam.

\* \* \* \* \*